June 29, 1926
S. APOSTOLOFF
DRY CELL
Filed Nov. 28, 1919
1,590,716
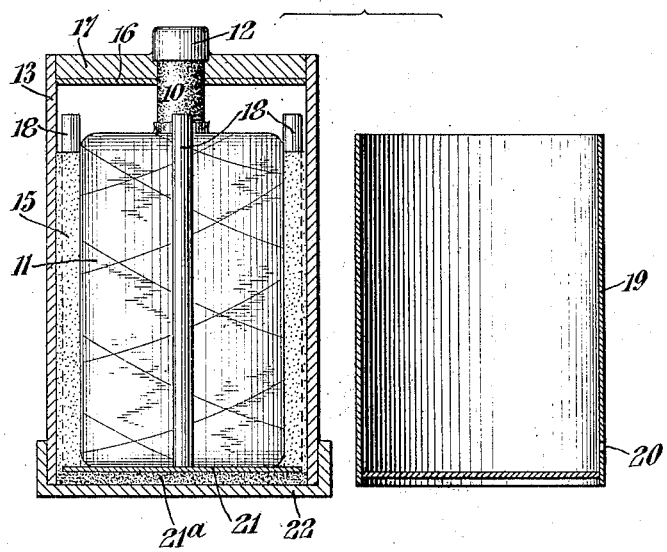
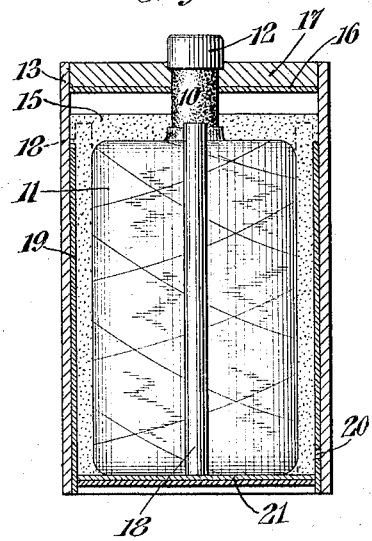
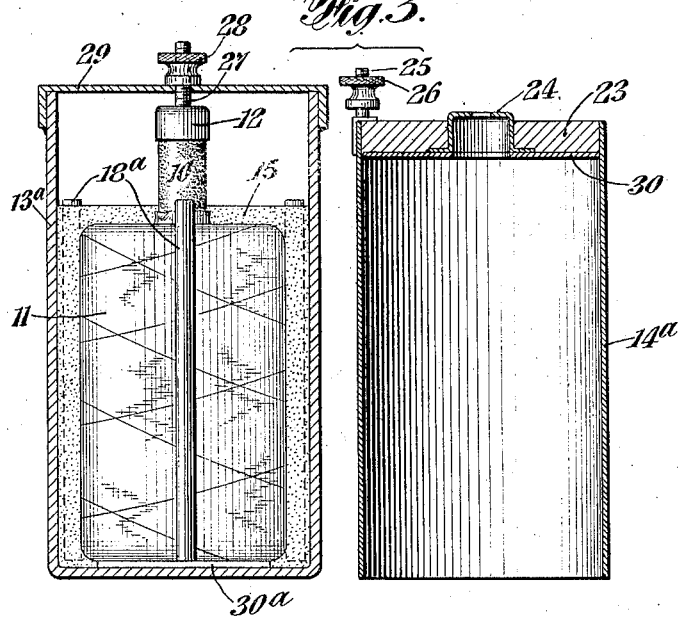
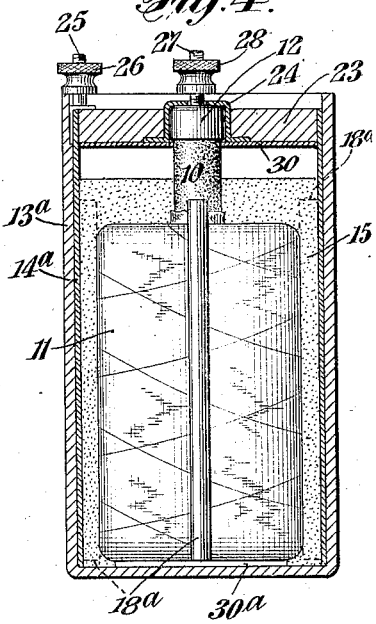
Serge Apostoloff, Inventor
By his Attorneys
Williams & Pritchard Patented June 29, 1926.

1,590,716

UNITED STATES PATENT OFFICE.

SERGE APOSTOLOFF, OF NEW YORK, N. Y.

DRY CELL.

Application filed November 28, 1919. Serial No. 341,215.

This invention relates to improvements in dry cells of the type where the electrodes and paste are kept out of operative relation until it is desired to use the cells.

One object of this invention is to produce a battery cell with the electrolyte in approximately normal position which may be kept for a long time without deterioration but which may be very quickly and easily made ready for immediate use.

In the old type of dry cell the action of the paste on the metallic container is quite destructive, even when the cell is on open circuit. For example, many of such cells lose over forty per cent of their efficiency in less than three months.

By my invention all destructive action of the paste on the metallic container is entirely eliminated while such cells are held in stock by a dealer or by a purchaser prior to their actual use. The cells manufactured according to applicant's invention may be shipped long distances without impairment of their efficiency.

A further object is to produce a dry cell, the parts of which may be very cheaply and independently manufactured, and which may be shipped separately, if desired, to any locality where they are to be assembled.

In my copending application, Serial Number 257,651, I have shown and described a type of cell having a tubular sleeve carrying the bobbin suspended therein and a lower cup contains an electrolyte paste, out of contact with the bobbin, but ready for instant use. To put this type of cell into action it was necessary to force the paste up from the lower cup into the space between the bobbin and its tubular sleeve, by telescoping the cups.

In my present invention, I provide a cell having a bobbin, a tubular sleeve, and a cup, but I locate my paste initially around the bobbin instead of in the bottom of the cup.

My broad invention may be embodied in two distinct forms. In each form the bobbin is carried within a tubular sleeve.

In the first form, the tubular sleeve is closed at the top, while in the second form it is closed at the bottom. In either case the prepared paste occupies the space immediately adjacent to the bobbin, and the cell may be made active by telescoping the sleeve and the cup.

An important advantage secured by both forms of my present invention is that substantially no movement of the paste is necessary in assembling the parts in order to activate the cell, the initial and final positions of the paste being practically identical.

In the employment of my invention the zinc cups will first be made separately. The manufacturer can then prepare the bobbins surrounded by the electrolyte paste in suitable receptacles, thus greatly facilitating production, and lowering its cost.

A further advantage of this type of cell is that it will instantly reach its maximum power when collapsed. This will be obvious from the fact that the carbon electrodes and the depolarizer are thoroughly impregnated with the paste from the beginning, and that when the zinc is inserted no time is required for the paste to diffuse through the depolarizer.

Several preferred forms of my invention are set forth in the following description and shown in the accompanying drawings, in which:—

Figure 1 is a sectional view of a battery cell made in accordance with one embodiment of my invention with the parts out of operative position.

Figure 2 is a sectional view of the parts in Figure 1 assembled for immediate use.

Figure 3 is a sectional view of a second embodiment with the parts out of operative position.

Figure 4 is a sectional view showing the parts of Figure 3 in assembled position.

Similar reference characters refer to similar parts throughout the several views.

Referring to the cell shown in Figures 1 and 2, the carbon electrode 10 has the depolarizing mass suitably secured in place around it by a container 11 of cloth or the like. A metallic terminal or contact cap 12 is secured to the top of the carbon electrode. The parts 10, 11 and 12 and the depolarizing mass will be hereinafter referred to as the bobbin, in accordance with the terminology of the trade. The tubular container 13 is filled with electrolyte paste 15. The washer 16 of fibrous material, and the seal 17 of wax or pitch, serve to tightly secure the bobbin to the container 13. The vertical wooden separating members 18 and the fibrous disc 21 assist in centering the bobbin and the zinc electrode 19 in the container 13. The electrode 19 is in the form of a tubular zinc cup and may have a vent hole 20 near the bottom. A layer 21ª of waterproofing material may be used at the bottom of the cell to protect the paste, but it is not essential. The bottom of the container 13 is closed by a cap 22 of fibrous material or the like. This cap serves to protect the bottom of the cell from accidental injuries such as abrasions, etc.

To put the cell into operation it is merely necessary to remove the protective cap 22, insert the zinc cup 19, and force it up through the layer 21ᵃ into the space between the bobbin and the container. During the above collapsing or telescoping operation, the vent 20 allows the entrapped air to escape, and the vertical members 18 and disc 21 operate to correctly center the zinc cup.

It will be noted from an inspection of Figure 1 that the paste does not entirely fill the inside of the cell, but that there is an air space in the top. This is to prevent the paste from creeping up above the pitch seal and to allow for the slight upward flow of the paste 15 displaced by the zinc electrode when it is inserted. The quantity of paste initially placed in the container will be equal to the cubic capacity of the inside of the cell diminished by the volume of the air space, the volume of the bobbin and spacers 18, and the displacement of the zinc cup in assembled position.

The parallel spacers 18 on the outside of the bobbin may be of any convenient number. Four of such spacers are preferred by applicant.

Referring now to the second embodiment of applicant's invention as shown in Figures 3 and 4, the bobbin consists as before of the carbon electrode 10, the depolarizing mass in the cloth container 11, and the metal cap 12.

The bobbin is surrounded by the paste 15 and the vertical wooden separating members 18, and is insulated from the bottom of the container 13ᵃ by a suitable washer 30ᵃ, preferably of fibrous material.

The terminal of the carbon electrode is provided with a threaded post 27 and the milled nut 28. The temporary cap 29 composed preferably of the same material as the container 13ᵃ serves to prevent evaporation or absorption of moisture as the case may be. If desired, a layer of wax may be inserted at the edge of this cap, as shown, to still further protect the paste from change.

The zinc cup 14ᵃ is open at the bottom instead of at the top and is provided with a terminal consisting of the binding post 25, upon which the nut 26 is threaded.

The top of the zinc cup 14ᵃ is also provided with the socket 24 of brass or other metal, having a central aperture to receive the binding post 27 of the carbon electrode. This socket is supported by the seal 23 preferably of pitch, and the annular washer 30 of fibrous material.

To assemble this cell from the inactive position shown in Figure 1 to the active position shown in Figure 2, it is merely necessary to remove the nut 28 and the cap 29 and to insert the zinc electrode 14ᵃ from above into the position shown in Figure 4.

The outside containers 13 and 13ᵃ may be made of any waterproof insulating material. I prefer, however, to use cardboard suitably impregnated with paraffin. I may also use glazed or enameled metal. Another method of constructing the outside container is to coat the cardboard tube with celluloid on the inside and paraffin on the outside. Owing to the non-metallic character of the container 13, the ordinary exterior insulating covering may be dispensed with. This is particularly advantageous when the cells are to be placed in metal flash-light tubes.

In carrying out my invention, I do not desire to be limited to any of the examples disclosed herein, but it will be understood that many variations may be made within the general principles and scope of the invention.

I claim:—

In a dry cell of the type described, a bobbin electrode suspended within a cup-shaped inverted container of non-conducting material, means between the bobbin and the container to hold the bobbin in the central position, said means comprising longitudinal spacing rods and a supply of electrolytic paste, an insulating disc secured upon the bottom of said bobbin, a layer of paraffin located below said insulating disc and forming a bottom closure for said container, and a zinc cup-shaped electrode fitting the inside of said container and adapted to be inserted upwardly therein to surround the bobbin and activate the cell.

In testimony whereof, I have affixed my signature to this specification.

SERGE APOSTOLOFF.